(12) United States Patent
Nakahara et al.

(10) Patent No.: US 10,220,373 B2
(45) Date of Patent: Mar. 5, 2019

(54) CARRIER FOR EXHAUST GAS PURIFICATION CATALYST

(71) Applicant: MITSUI MINING & SMELTING CO., LTD., Tokyo (JP)

(72) Inventors: Yunosuke Nakahara, Saitama (JP); Ohki Houshito, Saitama (JP); Hironori Iwakura, Saitama (JP); Yuki Nagao, Saitama (JP); Masato Machida, Kumamoto (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 15/358,172

(22) Filed: Nov. 22, 2016

(65) Prior Publication Data

US 2017/0120221 A1 May 4, 2017

Related U.S. Application Data

(62) Division of application No. 14/785,417, filed as application No. PCT/US2014/061470 on Apr. 23, 2014.

(30) Foreign Application Priority Data

Apr. 26, 2013 (JP) .................................. 2013-094197

(51) Int. Cl.
*B01D 53/94* (2006.01)
*B01J 21/02* (2006.01)
(Continued)

(52) U.S. Cl.
CPC ............ *B01J 23/10* (2013.01); *B01D 53/945* (2013.01); *B01J 21/02* (2013.01); *B01J 23/44* (2013.01); *B01J 23/58* (2013.01); *B01J 23/63* (2013.01); *B01J 35/002* (2013.01); *F01N 3/101* (2013.01); *F01N 3/106* (2013.01); *B01D 2255/1023* (2013.01); *B01D 2255/204* (2013.01); *B01D 2255/2042* (2013.01); *B01D 2255/2045* (2013.01); *B01D 2255/2063* (2013.01);
(Continued)

(58) Field of Classification Search
None
See application file for complete search history.

(56) References Cited

U.S. PATENT DOCUMENTS 3,057,677 A 10/1962 Ballman
3,954,670 A 5/1976 Pine
(Continued)

FOREIGN PATENT DOCUMENTS

| | | |
|---|---|---|
| CN | 1704381 | 12/2005 |
| JP | 06-099069 | 4/1994 |

(Continued)

OTHER PUBLICATIONS

Extended European Search Report dated Dec. 16, 2016; Application No. 14788080.1.
(Continued)

*Primary Examiner* — Colin W. Slifka
(74) *Attorney, Agent, or Firm* — Young & Thompson

(57) ABSTRACT

The exhaust gas purification catalyst carrier of the invention includes a modified aluminum borate which contains aluminum borate and at least one addition element selected from the group consisting of a rare earth element and an alkaline earth metal and which has an electronegativity of 2.732 or lower.

1 Claim, 1 Drawing Sheet

(51) Int. Cl.
*B01J 23/10* (2006.01)
*F01N 3/10* (2006.01)
*B01J 23/58* (2006.01)
*B01J 23/63* (2006.01)
*B01J 23/44* (2006.01)
*B01J 35/00* (2006.01)

(52) U.S. Cl.
CPC ............ *B01D 2255/2065* (2013.01); *B01D 2255/2066* (2013.01); *B01D 2255/2068* (2013.01); *B01D 2255/2092* (2013.01); *B01D 2255/70* (2013.01); *B01J 2523/00* (2013.01); *F01N 2570/10* (2013.01); *Y02T 10/22* (2013.01)

(56) References Cited

U.S. PATENT DOCUMENTS

| | | | |
|---|---|---|---|
| 4,645,753 | A | 2/1987 | Zletz |
| 4,990,480 | A | 2/1991 | Luetkens, Jr. et al. |
| 5,043,308 | A | 8/1991 | Luetkens |
| 2013/0116115 | A1 | 5/2013 | Sato et al. |

FOREIGN PATENT DOCUMENTS

| | | |
|---|---|---|
| JP | 07-171392 | 7/1995 |
| JP | 08-281071 | 10/1996 |
| JP | 2001-172626 A | 6/2001 |
| JP | 2002-370035 | 12/2002 |
| JP | 2012-016685 | 1/2012 |
| JP | WO2013/039037 | 3/2013 |
| WO | WO2012/005375 | 1/2012 |

OTHER PUBLICATIONS

Aluminoborate Glass-Ceramics with Low Thermal Expansivity by: John F. MacDowell; Journal of the American Cerami Society; 73 Aug. 1990, No. 8, Westerville, OH; XP000162932; pp. 2287-2292.
International Search Report, PCT/JP2014/061470, dated Aug. 5, 2014.
K. Ikeue et al., Structure and Catalytic Properties of Pd/10Al2O3 2B2O3. Effect of Preparation Routes and Additives, Bull. Chem. Soc. Jpn., 2012, 85, 468-474., Abstract, Experimental, Results and Discussion, Figures, Tables.

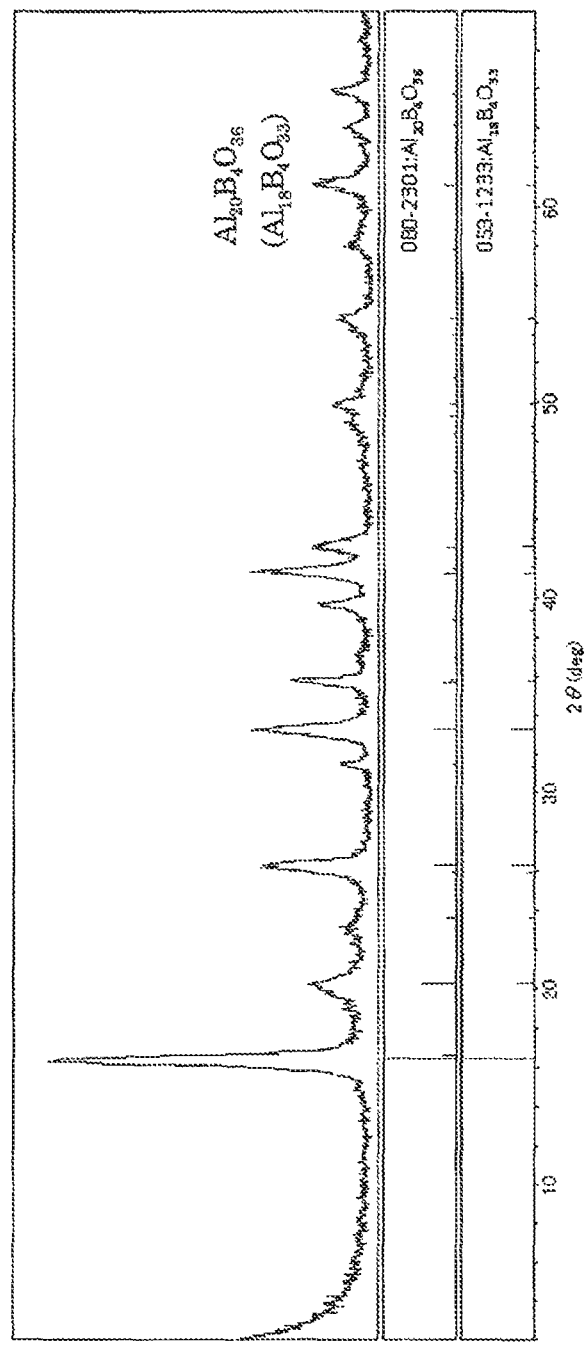

ers to an exhaust gas purification catalyst carrier, to an exhaust gas purification catalyst, and to an exhaust gas purification catalyst product, which exhibit excellent exhaust gas purification performance, (in particular CO removal performance), in a fuel-rich region (hereinafter referred to simply as a "rich region"), even after long-term use thereof under high-temperature conditions.

BACKGROUND ART

Exhaust gas discharged from an internal combustion engine of, for example, an automobile contains toxic components such as hydrocarbons (HC), carbon monoxide (CO), and nitrogen oxides ($NO_x$). Hitherto, three-way catalysts have been used for removing such toxic components for detoxifying the exhaust gas.

Such three-way catalysts include a noble metal (e.g., Pt, Pd, or Rh) serving as a catalytically active component; a material such as alumina, ceria, zirconia, or oxygen-occluding ceria-zirconia composite oxide, serving as a carrier; and a catalyst support made of a ceramic or metallic material and having a shape of honeycomb, plate, pellet, etc.

Recently, the regulation of automobile exhaust gas has become more strict, and the demand and prices of Pt and Rh, which are noble metals serving as a main catalytically active component of internal combustion engine exhaust gas purification catalysts, have risen. Since a rise in Rh price is a critical issue, efforts have been made on reduction of exhaust gas purification catalyst production cost by use of inexpensive Pd as a catalytically active component, and various means therefor have been proposed (see, for example, Patent Documents 1, 2, and 3). Meanwhile, there are some cases where a catalyst carrier made of aluminum borate is used. In one case of such a catalyst, a catalyst component is deposited on a powder compact which is covered with aluminum borate whiskers and which includes voids therein, whereby gas diffusivity is enhanced (see Patent Document 4).

However, it has been reported that Pd causes impairment in exhaust gas purification performance by sintering thereof at high temperature in a reducing atmosphere. Thus, suppression of Pd sintering is an inevitable issue for designing coming catalysts of a noble-metal saving format. Also, aluminum borate whiskers, having an acicular shape, have a small specific surface area, which causes cohesion of noble metal elements after long-term use of the relevant catalyst under high-temperature conditions. That is, durability of the catalyst is unsatisfactory.

In order to solve such problems, the present applicant previously developed an exhaust gas purification catalyst which exhibits excellent $NO_x$ purification performance, particularly in a rich region. The catalyst includes a carrier containing a substituted aluminum borate in which 2.5 to 11.5 at. % aluminum atoms are substituted by Fe, Co, Ga, or Ni atoms, and Pd supported on the carrier (see Patent Document 5).

PRIOR ART DOCUMENTS

Patent Documents

Patent Document 1: Japanese Patent Application Laid-Open (kokai) No. Hei 06-099069
Patent Document 2: Japanese Patent Application Laid-Open (kokai) No. Hei 07-171392
Patent Document 3: Japanese Patent Application Laid-Open (kokai) No. Hei 08-281071
Patent Document 4: Japanese Patent Application Laid-Open (kokai) No. 2002-370035
Patent Document 5: WO 2012/005375

SUMMARY OF THE INVENTION

Problems to be Solved by the Invention

However, the exhaust gas purification catalyst disclosed in Patent Document 5, employing a substituted aluminum borate, exhibits somewhat lower purification performance after long-term use thereof in a rich region, although the catalyst exhibits excellent purification performance after long-term use thereof under a fuel-lean or a stoichiometric condition.

In the meantime, the exhaust gas purification catalyst for automobiles is designed in accordance with the type of automobile. Specifically, automobiles mainly employing a combustion mode in a lean condition (at high air-fuel ratio) are provided with an exhaust gas purification catalyst which is durable in a lean condition, while automobiles mainly employing a combustion mode in a rich region (at low air-fuel ratio) are provided with an exhaust gas purification catalyst which is durable in a rich region.

Thus, an object of the present invention is to provide an exhaust gas purification catalyst carrier, an exhaust gas purification catalyst, and an exhaust gas purification catalyst product, which exhibit excellent exhaust gas purification performance, (in particular CO removal performance), in a rich region, even after long-term use thereof under high-temperature conditions.

Means for Solving the Problems

The present inventors have conducted extensive studies in order to attain the aforementioned object, and have found that the electronegativity of a catalyst carrier made of a modified aluminum borate to which an alkaline earth element or a rare earth element has been added can be reduced, to thereby promote electron supply from noble metal elements to the carrier, whereby the noble metal elements are immobilized on the carrier even in a rich region, to thereby attain excellent Pd dispersion degree and catalytic activity, even after long-term use thereof in a rich region. The present invention has been accomplished on the basis of this finding.

Notably, characteristics, its production method, etc. of aluminum borate are disclosed in, for example, Siba P. Ray, "Preparation and Characterization of Aluminum Borate", J. Am. Ceram. Soc., 75[9], p. 2605-2609 (1992).

Conventionally, aluminum borate is represented by a formula $9Al_2O_3 \cdot 2B_2O_3$ ($Al_{18}B_4O_{33}$), obtained through chemical analysis. However, a thesis (Martin et al., "Crystal-chemistry of mullite-type aluminoborates $Al_{18}B_4O_{33}$ and $Al_5BO_9$: A stoichiometry puzzle", Journal of Solid State Chemistry 184(2011) p. 70 to 80), discloses crystal structure analyses revealing that aluminum borate is represented by $Al_5BO_9$ ($5Al_2O_3:B_2O_3$, $Al_{20}B_4O_{36}$); i.e., formula $10Al_2O_3 \cdot 2B_2O_3$. The thesis also discloses that aluminum borate may be represented by either formula $9Al_2O_3 \cdot 2B_2O_3$ ($Al_{18}B_4O_{33}$) or $Al_5BO_9$ ($5Al_2O_3:B_2O_3$, $Al_{20}B_4O_{36}$), meaning that the two formulas represent a unique substance.

Thus, as used herein, the term "aluminum borate" encompasses aluminum borate represented by formula $10Al_2O_3 \cdot 2B_2O_3$ ($5Al_2O_3:B_2O_3$, $Al_{20}B_4O_{36}$) and aluminum borate represented by formula $9Al_2O_3 \cdot 2B_2O_3$ ($Al_{18}B_4O_{33}$).

Accordingly, a characteristic feature of the exhaust gas purification catalyst carrier of the present invention resides in that the catalyst carrier comprises a modified aluminum borate which contains aluminum borate (in particularly aluminum borate having a cage structure) and at least one addition element selected from the group consisting of a rare earth element and an alkaline earth metal and which has an electronegativity of 2.732 or lower. Another characteristic feature resides in that the catalyst carrier comprises a modified aluminum borate which contains aluminum borate and at least one addition element selected from the group consisting of a rare earth element and an alkaline earth metal, in an amount of 6 mass % or more as an oxide thereof. The aluminum borate employed in the present invention encompasses aluminum borate species having an aluminum oxide to boron oxide ratio of 10:2 to 9:2; i.e., an aluminum borate represented by formula $10Al_2O_3 \cdot 2B_2O_3$ ($5Al_2O_3:B_2O_3$, $Al_{20}B_4O_{36}$) and an aluminum borate represented by formula $9Al_2O_3 \cdot 2B_2O_3$ ($Al_{18}B_4O_{33}$). The aluminum borate employed in the present invention can be identified as an aluminum borate represented by formula $10Al_2O_3 \cdot 2B_2O_3$ through X-ray diffractometry. However, since the formula $9Al_2O_3 \cdot 2B_2O_3$ ($Al_{18}B_4O_{33}$) is also given in an X-ray diffraction standard chart, the aluminum borate can also be identified as an aluminum borate represented by formula $9Al_2O_3 \cdot 2B_2O_3$ ($Al_{18}B_4O_{33}$).

The aforementioned addition element preferably contains two or more such elements. The addition element is particularly preferably an element selected from the group consisting of Ca, Sr, Ba, La, Pr, Nd, and Ce.

The exhaust gas purification catalyst of the present invention includes the aforementioned exhaust gas purification catalyst carrier, and Pd supported on the carrier.

The exhaust gas purification catalyst product of the present invention includes a catalyst support formed of a ceramic or metallic material, and a layer of the aforementioned exhaust gas purification catalyst, the layer being supported on the catalyst support.

Effects of the Invention

The exhaust gas purification catalyst carrier, the exhaust gas purification catalyst, and the exhaust gas purification catalyst product according to the present invention exhibit excellent exhaust gas purification performance (in particular, CO removal performance) in a rich region, after long-term use thereof under high-temperature conditions.

BRIEF DESCRIPTION OF THE DRAWINGS

FIG. 1 An XRD pattern of aluminum borate produced in Referential Example 1.

MODES FOR CARRYING OUT THE INVENTION

The carrier employed in the exhaust gas purification catalyst of the present invention comprises a modified aluminum borate which contains at least one addition element selected from the group consisting of a rare earth element and an alkaline earth metal and has an electronegativity of 2.732 or lower. Alternatively, the catalyst carrier comprises a modified aluminum borate which contains aluminum borate and at least one addition element selected from the group consisting of a rare earth element and an alkaline earth metal, in an amount of 6 mass % or more as an oxide thereof, preferably 7 mass % or more. When such a modified aluminum borate is employed, an exhaust gas purification catalyst containing Pd supported on the carrier exhibits excellent Pd dispersion degree and catalytic activity in a rich region after long-term use of the catalyst under high-temperature conditions.

Preferably, the addition element contained in the modified aluminum borate of the present invention is not a partial substitution element with respect to boron or aluminum of aluminum borate, but is supported on aluminum borate or modifies aluminum borate. In the preferred case, the addition element is present as an oxide or the like of the addition element such as a crystal grain boundary. When such an addition element is analyzed through XRD, no substantial shift is observed for the peak attributed to aluminum borate, but a peak attributed to the addition element is observed as, for example, a corresponding oxide peak.

Hereinafter, such aluminum borate species may also be referred to collectively as modified aluminum borate.

The aforementioned aluminum borate species may be produced through, for example, the following method.

<Solid-Phase Method>

Boric acid was weighed in such an amount that the compositional proportions of a target compound, aluminum borate (formula: $Al_{20}B_4O_{36}$), were attained, and dissolved in ion-exchange water. Subsequently, the solution was mixed with a specifically weighed boehmite acetate sol, and the resultant mixture was heated under stirring. The thus-formed gel was dried at about 120° C. for 12 hours or longer. After completion of drying, the dried product was fired at about 300° C. for about one hour and then at about 1,000° C. for about 5 hours, to thereby yield the target aluminum borate.

More specifically, boric acid was weighed in such an amount that the compositional proportions of the target aluminum borate (formula: $Al_{20}B_4O_{36}$) were attained, and dissolved in ion-exchange water. Subsequently, the solution was mixed with a specifically weighed boehmite acetate sol, and the resultant mixture was heated under stirring. The thus-formed gel was dried at 120° C. for 12 hours or longer. After completion of drying, the dried product was fired at 300° C. for one hour and then at 1,000° C. for 5 hours, to thereby yield the target aluminum borate.

<Reverse Co-Precipitation Method>

Boric acid was weighed in such an amount that the compositional proportions of a target compound, aluminum borate (formula: $Al_{20}B_4O_{36}$), were attained, and dissolved in hot pure water. Subsequently, the solution was mixed with a specifically weighed aluminum nitrate, to thereby prepare a solution. The solution was added dropwise to aqueous ammonium carbonate. The thus-formed precipitates were washed with pure water with filtration, and the solid was dried overnight at about 120° C. and fired in air at about 300° C. for about one hour. Thereafter, the dried product was fired at about 1,000° C. for about 5 hours, to thereby yield the target aluminum borate.

More specifically, boric acid was weighed in such an amount that the compositional proportions of the target aluminum borate (formula: $Al_{20}B_4O_{36}$) were attained, and dissolved in ion-exchange water. Subsequently, the solution was mixed with a specifically weighed aluminum nitrate nanohydrate, to thereby prepare a solution. The solution was added dropwise to aqueous ammonium carbonate. The thus-formed precipitates were washed with pure water with filtration, and the solid was dried at 120° C. for 12 hours or longer and fired in air at 300° C. for one hour. Thereafter, the dried product was fired in air at 1,000° C. for 5 hours, to thereby yield the target aluminum borate. No significant difference was observed between the aluminum borate prepared through the above reverse co-precipitation and that prepared through the aforementioned solid-phase method.

The carrier of the exhaust gas purification catalyst of the present invention contains a modified aluminum borate prepared by modifying (or depositing) at least one element selected from the group consisting of a rare earth element and an alkaline earth metal with (or on) the above-produced aluminum borate.

In one mode of the method of producing such a modified aluminum borate, aluminum borate was immersed in a solution containing a specific amount of a compound of additional element (e.g., a nitrate salt, a sulfate salt, or an acetate salt), subjecting the mixture to evaporation to dryness, and firing the solid at a specific temperature (e.g., 400 to 1,000° C.).

The addition element content, reduced to the corresponding oxide content; i.e., the ratio (amount of addition element oxide)/(sum of amount of aluminum borate+amount of addition element oxide) selected in the present invention, is 0.1 to 20 mass %, preferably 3 to 15 mass %, more preferably 6 to 13 mass %, still more preferably 7 to 13 mass %.

The modified aluminum borate has an electronegativity of 2.732 or lower, or contains at least one element selected from the group consisting of a rare earth element and an alkaline earth metal, in an amount of 6 mass % or more as an oxide thereof, preferably 7 mass % or more. When the electronegativity is higher than the above upper limit, the supported Pd component tends to be undesirably stable PdO, whereby the catalyst becomes inert to reduction of NOx or the like, which is not preferred. No particular limitation is imposed on the lower limit of the electronegativity, but the practical value thereof is conceivably about 2.700. Also, when said at least one element selected from the group consisting of a rare earth element and an alkaline earth metal is added as an oxide in an amount of 7 mass % or more, electrons are sufficiently supplied from noble metal elements to the carrier, whereby the noble metal elements are immobilized on the carrier even in a rich region, to thereby attain excellent Pd dispersion degree and catalytic activity, even after long-term use thereof in a rich region.

The exhaust gas purification catalyst of the present invention contains Pd supported on a carrier containing the aforementioned modified aluminum borate. By virtue of employing Pd supported on the modified aluminum borate, the exhaust gas purification catalyst exhibits excellent exhaust gas purification performance (in particular, CO removal performance) in a rich region, after long-term use thereof under high-temperature conditions. The amount of Pd supported on the carrier is preferably 0.05 to 5 mass %, based on the mass of the carrier, more preferably 0.4 to 3 mass %. When the amount of supported Pd based on the mass of the carrier is 0.05 mass % or more, durability of the catalyst increases, and when the amount is 5 mass % or less, Pd can be consistently supported in a highly dispersed state. In contrast, when the amount of supported Pd based on the mass of the carrier is less than 0.05 mass %, durability is poor due to a small absolute amount of noble metal, and when the amount is in excess of 5 mass %, supporting of Pd in a highly dispersion state may fail to be attained due to an excess amount of noble metal. In the present specification, the amount of supported Pd is reduced to the mass of metallic Pd.

In one mode of production, the exhaust gas purification catalyst of the present invention may be produced by mixing the modified aluminum borate with a solution of a Pd compound (a soluble Pd compound; e.g., Pd nitrate, Pd chloride, or Pd sulfate) so that the amount of supported Pd based on the mass of the carrier is adjusted to 0.2 to 3 mass %, and then subjecting the mixture to evaporation to dryness and firing the dried product at 450 to 650° C. Notably, in the specification and other attachments, no particular limitation is imposed on the solvent for forming the "solution," so long as the solvent can form the solution, and water is generally used. Notably, so long as the effects of the present invention are not impaired, the modified aluminum borate may be used in combination with an additional carrier, such as a porous body of a compound selected from the group consisting of silica, ceria, ceria-zirconia, alumina, and titania.

The exhaust gas purification catalyst product of the present invention includes a catalyst support formed of a ceramic or metallic material, and a layer of the aforementioned exhaust gas purification catalyst of the present invention, the layer being formed and supported on the catalyst support. In such an exhaust gas purification catalyst product, no particular limitation is imposed on the shape of the catalyst support formed of a ceramic or metallic material, and the support is generally in the form of honeycomb, plate, pellet, etc. In the case of a honeycomb shape support, the amount of exhaust gas purification catalyst supported is preferably 70 to 300 g/L, more preferably 100 to 200 g/L. When the catalyst amount is less than 70 g/L, durability of the catalyst tends to decrease due to an insufficient catalyst amount. Examples of the material of the catalyst support include ceramic materials such as alumina ($Al_2O_3$), mullite ($3Al_2O_3$-$2SiO_2$), and cordierite ($2MgO$-$2Al_2O_3$-$5SiO_2$), and metallic materials such as stainless steel.

The exhaust gas purification catalyst product of the present invention may be produced through the following method. A modified aluminum borate (50 to 70 parts by mass, preferably 50 to 60 parts by mass), La-stabilized alumina (20 to 40 parts by mass, preferably 20 to 30 parts by mass), barium hydroxide (0 to 3 parts by mass, preferably 1 to 3 parts by mass), and an alumina-bases binder (5 to 10 parts by mass) are mixed with a Pd compound solution, and the mixture is pulverized under wet conditions, to thereby prepare a slurry. The thus-prepared slurry is applied onto, through a widely known technique, a catalyst support formed of a ceramic or metallic material, preferably a honeycomb-shape catalyst support. The resultant structure is dried and then fired at 450 to 650° C., to thereby produce an exhaust gas purification catalyst product which includes a catalyst support, and a layer of the exhaust gas purification catalyst, the layer being supported on the catalyst support.

The present invention will next be described in detail by way of Referential Examples, Examples, and Comparative Examples. Notably, the addition element content is derived as the ratio of amount of addition element oxide/total amount of aluminum borate and addition element oxide. In Tables 1 to 3, 10A2B denotes $10Al_2O_3 \cdot 2B_2O_3$.

Referential Example 1

An aluminum borate ($Al_{20}B_4O_{36}$) was prepared through the following solid-phase method. Specifically, boric acid was weighed in such an amount that the compositional proportions of a target compound were attained, and dissolved in ion-exchange water. Subsequently, the solution was mixed with a specifically weighed boehmite acetate sol, and the resultant mixture was heated under stirring. The thus-formed gel was dried at 120° C. for 12 hours or longer. After completion of drying, the dried product was fired in air at 300° C. for one hour and then at 1,000° C. for 5 hours, to thereby yield the aluminum borate of interest. The aluminum borate was found to have an XRD pattern shown in FIG. 1. As is clear from FIG. 1, the aluminum borate was identified as an aluminum borate represented by formula $10Al_2O_3 \cdot 2B_2O_3$, through X-ray diffraction analysis.

Notably, since the formula $9Al_2O_3 \cdot 2B_2O_3$ ($Al_{18}B_4O_{33}$) is also given in an X-ray diffraction standard chart, the yielded product was also identified as an aluminum borate represented by formula $9Al_2O_3 \cdot 2B_2O_3$ ($Al_{18}B_4O_{33}$).

Referential Example 2

An aluminum borate ($Al_{20}B_4O_{36}$) was prepared through a reverse co-precipitation method. Specifically, boric acid was weighed in such an amount that the compositional proportions of a target compound were attained, and dissolved in ion-exchange water. Subsequently, the solution was mixed with a specifically weighed aluminum nitrate nanohydrate, to thereby prepare a solution. Then, the solution was added dropwise to aqueous ammonium carbonate, to thereby form precipitates. The precipitates were washed with pure water with filtration, and dried at 120° C. for 12 hours or longer, followed by firing in air at 300° C. for one hour and further in air at 1,000° C. for 5 hours, to thereby yield the aluminum borate of interest. No significant difference was observed between the aluminum borate prepared through the above co-precipitation and that prepared through the solid-phase method of Referential Example 1.

Aluminum Borate Production Example 1

To a three-neck flask dipped in a hot water bath at 50° C., 2-propanol (1.5 L), aluminum isopropoxide (200 g) pulverized by means of an agate mortar, and boron n-propoxide (40.9 g) were added, and the mixture was stirred under a flow of nitrogen gas. After complete dissolution of aluminum isopropoxide (confirmation of transparency of the solution), a mixture (24.6 g) of 2-propanol:water=1:1 was gradually added dropwise to the solution for hydrolysis, to thereby form a white gel substance. The thus-formed precipitates were washed sequentially with ethanol and pure water, followed by filtration. Thereafter, the solid was dried overnight (for about 15 hours) at 120° C., and fired in air at 300° C. for 3 hours and further in air at 1,000° C. for 5 hours, to thereby yield an aluminum borate as a white product. Through X-ray diffractometry, this aluminum borate was identified as an aluminum borate represented by formula $10Al_2O_3 \cdot 2B_2O_3$.

Example 1

The aluminum borate produced in Production Example 1 was immersed in aqueous lanthanum nitrate and in aqueous strontium nitrate. The amount of lanthanum nitrate in the aqueous solution and that of the strontium nitrate in the aqueous solution were adjusted such that the $La_2O_3$ content and the SrO content of the aluminum borate represented by $10Al_2O_3 \cdot 2B_2O_3$ modified with target $La_2O_3$ and SrO were attained as 5 mass % and 5 mass %, respectively. Thereafter, the mixture was dried overnight (for about 15 hours) at 120° C. to dryness, and then fired in air at 600° C. for 3 hours, to thereby yield an aluminum borate represented by $10Al_2O_3 \cdot 2B_2O_3$ modified with $La_2O_3$ and SrO at 5 mass % and 5 mass %, respectively.

To the aluminum borate (99 parts by mass) represented by $10Al_2O_3 \cdot 2B_2O_3$ modified with $La_2O_3$ and SrO at 5 mass % and 5 mass %, and palladium nitrate (1 part by mass, as reduced to Pd metal), an appropriate amount of ion-exchange water was added, and the resultant slurry was stirred, dried, and fired at 500° C. for one hour.

Example 2

The aluminum borate produced in Production Example 1 was immersed in aqueous lanthanum nitrate and in aqueous praseodymium nitrate. The amount of lanthanum nitrate in the aqueous solution thereof and that of preseodymium nitrate in its aqueous solution were adjusted such that the $La_2O_3$ content and the $Pr_6O_{11}$ content of the aluminum borate represented by $10Al_2O_3 \cdot 2B_2O_3$ modified with target $La_2O_3$ and $Pr_6O_{11}$ were attained as 5 mass % and 5 mass %, respectively. Thereafter, the mixture was dried overnight (for about 15 hours) at 120° C. to dryness, and then fired in air at 600° C. for 3 hours, to thereby yield an aluminum borate represented by $10Al_2O_3 \cdot 2B_2O_3$ modified with $La_2O_3$ and $Pr_6O_{11}$ at 5 mass % and 5 mass %, respectively.

To the aluminum borate (99 parts by mass) represented by $10Al_2O_3 \cdot 2B_2O_3$ modified with $La_2O_3$ and $Pr_6O_{11}$ at 5 mass % and 5 mass %, and palladium nitrate (1 part by mass, as reduced to Pd metal), an appropriate amount of ion-exchange water was added, and the resultant slurry was stirred, dried, and fired at 500° C. for one hour.

Example 3

The aluminum borate produced in Production Example 1 was immersed in aqueous lanthanum nitrate and in aqueous calcium nitrate. The amount of lanthanum nitrate in the aqueous solution and that of the calcium nitrate in its aqueous solution were adjusted such that the $La_2O_3$ content and the CaO content of the aluminum borate represented by $10Al_2O_3 \cdot 2B_2O_3$ modified with target $La_2O_3$ and CaO were attained as 5 mass % and 5 mass %, respectively. Thereafter, the mixture was dried overnight (for about 15 hours) at 120° C. to dryness, and then fired in air at 600° C. for 3 hours, to thereby yield an aluminum borate represented by $10Al_2O_3 \cdot 2B_2O_3$ modified with $La_2O_3$ and CaO at 5 mass % and 5 mass %, respectively. To the aluminum borate (99 parts by mass) represented by $10Al_2O_3 \cdot 2B_2O_3$ modified with $La_2O_3$ and CaO at 5 mass % and 5 mass %, and palladium nitrate (1 part by mass, as reduced to Pd metal), an appropriate amount of ion-exchange water was added, and the resultant slurry was stirred, dried, and fired at 500° C. for one hour.

Example 4

The aluminum borate produced in Production Example 1 was immersed in aqueous lanthanum nitrate and in aqueous barium nitrate. The amount of lanthanum nitrate in the aqueous solution and that of the barium nitrate in its aqueous solution were adjusted such that the $La_2O_3$ content and the BaO content of the aluminum borate represented by $10Al_2O_3 \cdot 2B_2O_3$ modified with $La_2O_3$ and BaO were attained as 5 mass % and 5 mass %, respectively. Thereafter, the mixture was dried overnight (for about 15 hours) at 120° C. to dryness, and then fired in air at 600° C. for 3 hours, to thereby yield an aluminum borate represented by $10Al_2O_3.2B_2O_3$ modified with $La_2O_3$ and BaO at 5 mass % and 5 mass %, respectively.

To the aluminum borate (99 parts by mass) represented by $10Al_2O_3.2B_2O_3$ modified with $La_2O_3$ and BaO at 5 mass % and 5 mass %, and palladium nitrate (1 part by mass, as reduced to Pd metal), an appropriate amount of ion-exchange water was added, and the resultant slurry was stirred, dried, and fired at 500° C. for one hour.

Example 5

The aluminum borate produced in Production Example 1 was immersed in aqueous lanthanum nitrate and in aqueous neodymium nitrate. The amount of lanthanum nitrate in the aqueous solution and that of the neodymium nitrate in its aqueous solution were adjusted such that the $La_2O_3$ content and the $Nd_2O_3$ content of the aluminum borate represented by $10Al_2O_3.2B_2O_3$ modified with target $La_2O_3$ and $Nd_2O_3$ were attained as 5 mass % and 5 mass %, respectively. Thereafter, the mixture was dried overnight (for about 15 hours) at 120° C. to dryness, and then fired in air at 600° C. for 3 hours, to thereby yield an aluminum borate represented by $10Al_2O_3.2B_2O_3$ modified with $La_2O_3$ and $Nd_2O_3$ at 5 mass % and 5 mass %, respectively.

To the aluminum borate (99 parts by mass) represented by $10Al_2O_3.2B_2O_3$ modified with $La_2O_3$ and $Nd_2O_3$ at 5 mass % and 5 mass %, and palladium nitrate (1 part by mass, as reduced to Pd metal), an appropriate amount of ion-exchange water was added, and the resultant slurry was stirred, dried, and fired at 500° C. for one hour.

Example 6

The aluminum borate produced in Production Example 1 was immersed in aqueous lanthanum nitrate and in aqueous cerium nitrate. The amount of lanthanum nitrate in the aqueous solution and that of the cerium nitrate in its aqueous solution were adjusted such that the $La_2O_3$ content and the $CeO_2$ content of the aluminum borate represented by $10Al_2O_3.2B_2O_3$ modified with target $La_2O_3$ and $CeO_2$ were attained as 5 mass % and 5 mass %, respectively. Thereafter, the mixture was dried overnight (for about 15 hours) at 120° C. to dryness, and then fired in air at 600° C. for 3 hours, to thereby yield an aluminum borate represented by $10Al_2O_3.2B_2O_3$ modified with $La_2O_3$ and $CeO_2$ at 5 mass % and 5 mass %, respectively.

To the aluminum borate (99 parts by mass) represented by $10Al_2O_3.2B_2O_3$ modified with $La_2O_3$ and $CeO_2$ at 5 mass % and 5 mass %, and palladium nitrate (1 part by mass, as reduced to Pd metal), an appropriate amount of ion-exchange water was added, and the resultant slurry was stirred, dried, and fired at 500° C. for one hour.

Comparative Example 1

γ-$Al_2O_3$ (99 parts by mass) and palladium nitrate (1 part by mass, as reduced to metallic Pd) were added to an appropriate amount of ion-exchange water, and the resultant slurry was stirred. Then, the slurry was dried and fired at 500° C. for one hour.

Comparative Example 2

The aluminum borate produced in Production Example 1 was immersed in aqueous lanthanum nitrate. The amount of lanthanum nitrate in the aqueous solution was adjusted such that the $La_2O_3$ content of the aluminum borate represented by $10Al_2O_3.2B_2O_3$ modified with target $La_2O_3$ was attained as 5 mass %. Thereafter, the mixture was dried overnight (for about 15 hours) at 120° C. to dryness, and then fired in air at 600° C. for 3 hours, to thereby yield an aluminum borate represented by $10Al_2O_3.2B_2O_3$ modified with $La_2O_3$ at 5 mass %.

To the aluminum borate (99 parts by mass) represented by $10Al_2O_3.2B_2O_3$ modified with $La_2O_3$ at 5 mass %, and palladium nitrate (1 part by mass, as reduced to Pd metal), an appropriate amount of ion-exchange water was added, and the resultant slurry was stirred, dried, and fired at 500° C. for one hour.

Comparative Example 3

The aluminum borate produced in Production Example 1 was immersed in aqueous lanthanum nitrate and in aqueous barium nitrate. The amount of lanthanum nitrate in the aqueous solution thereof and that of the barium nitrate in its aqueous solution were adjusted such that the $La_2O_3$ content and the BaO content of the aluminum borate represented by $10Al_2O_3.2B_2O_3$ modified with target $La_2O_3$ and BaO were attained as 1 mass % and 2 mass %, respectively. Thereafter, the mixture was dried overnight (for about 15 hours) at 120° C. to dryness, and then fired in air at 600° C. for 3 hours, to thereby yield an aluminum borate represented by $10Al_2O_3.2B_2O_3$ modified with $La_2O_3$ and BaO at 1 mass % and 2 mass %, respectively.

To the aluminum borate (99 parts by mass) represented by $10Al_2O_3.2B_2O_3$ modified with $La_2O_3$ and BaO at 1 mass % and 2 mass %, and palladium nitrate (1 part by mass, as reduced to Pd metal), an appropriate amount of ion-exchange water was added, and the resultant slurry was stirred, dried, and fired at 500° C. for one hour.

<Catalytic Performance Evaluation Method>

Each of the samples produced in the Examples and Comparative Examples was assessed in terms of purification performance with respect to a simulated exhaust gas, by means of an immobilized bed flow-type reactor. Each catalyst powder (50 mg) was placed in the reactor tube, and a gas which simulated a complete combustion gas and which was composed of NO (0.05%), CO (0.39%), $C_3H_6$ (1,200 ppmC), $O_2$ (0.4%), $H_2$ (0.1%), and $H_2O$ (10%), the balance being $N_2$, was fed to the catalyst powder at a total flow rate of 1,000 cc/min. The reactor tube was heated to 500° C. at a temperature elevation rate of 10° C./min, and maintained at 500° C. for 10 minutes, for carrying out a preliminary treatment. Subsequently, the reactor tube was cooled, and heated again from 100° C. to 500° C. at 10° C./min.

The outlet gas composition was determined by means of a CO/NO analyzer (model: PG240, product of Horiba) and an HC analyzer (model: VMF-1000F, product of Shimadzu Corporation).

Each catalyst was aged at 900° C. and 25H in a rich region of A/F=14.0 ($H_2O$=10%).

<Pd Dispersion Degree Evaluation Method>

The degree of Pd dispersion was measured according to the CO pulse adsorption method (i.e., a known technique) (T. Takeguchi, S. Manabe, R. Kikuchi, K. Eguchi, T. Kanazawa, S. Matsumoto, Applied Catalysis A: 293 (2005) 91). The degree of Pd dispersion was calculated by the following formula: degree of Pd dispersion=the amount (by mole) of Pd corresponding to the amount of CO adsorbed/the total amount (by mole) of Pd contained in the catalyst of interest.

<Catalytic Performance Evaluation Results>

Table 1 shows the values of the temperature (T50) at which 50% removal of NO and HC was completed in the presence of each catalyst after aging, and the temperature (T70) at which 70% removal of CO was completed in the presence of the catalyst. As is clear from Table 1, the catalyst samples of the Examples exhibited more excellent low-temperature catalytic activity, as compared with those of the Comparative Examples. Among three components, CO removal performance was remarkably excellent.

TABLE 1

| | Carrier composition | NO-T50 | HC-T50 | CO-T70 |
|---|---|---|---|---|
| Comp. Ex. 1 | γ-$Al_2O_3$ | 392.2 | 360.2 | 374.1 |
| Comp. Ex. 2 | 5 wt. % $La_2O_3$/10A2B | 375.5 | 355.5 | 373.1 |
| Comp. Ex. 3 | (1 wt. % $La_2O_3$ + 2 wt. % BaO)/10A2B | 371.5 | 353.7 | 372.1 |
| Ex. 1 | (5 wt. % $La_2O_3$ + 5 wt. % SrO)/10A2B | 371.3 | 352.9 | 365.8 |
| Ex. 2 | (5 wt. % $La_2O_3$ + 5 wt. % $Pr_6O_{11}$)/10A2B | 357.6 | 336.1 | 347.3 |
| Ex. 3 | (5 wt. % $La_2O_3$ + 5 wt. % CaO)/10A2B | 365.2 | 344.3 | 357.3 |
| Ex. 4 | (5 wt. % $La_2O_3$ + 5 wt. % BaO)/10A2B | 371.3 | 353.8 | 365.9 |
| Ex. 5 | (5 wt. % $La_2O_3$ + 5 wt. % $Nd_2O_3$)/10A2B | 371.3 | 352.5 | 365.5 |
| Ex. 6 | (5 wt. % $La_2O_3$ + 5 wt. % $CeO_2$)/10A2B | 362.5 | 341.0 | 353.2 |

Table 2 shows Pd dispersion degrees of the tested catalyst after aging. As is clear from Table 2, Pd dispersion degree of the catalysts of the Examples was higher than that of the Comparative Examples.

TABLE 2

| | Carrier composition | Pd dispersion degree |
|---|---|---|
| Comp. Ex. 1 | γ-$Al_2O_3$ | 2.79% |
| Comp. Ex. 2 | 5 wt. % $La_2O_3$/10A2B | 3.24% |
| Comp. Ex. 3 | (1 wt. % $La_2O_3$ + 2 wt. % BaO)/10A2B | 3.44% |
| Ex. 1 | (5 wt. % $La_2O_3$ + 5 wt. % SrO)/10A2B | 3.68% |
| Ex. 2 | (5 wt. % $La_2O_3$ + 5 wt. % $Pr_6O_{11}$)/10A2B | 4.77% |
| Ex. 3 | (5 wt. % $La_2O_3$ + 5 wt. % CaO)/10A2B | 4.56% |
| Ex. 4 | (5 wt. % $La_2O_3$ + 5 wt. % BaO)/10A2B | 3.80% |
| Ex. 5 | (5 wt. % $La_2O_3$ + 5 wt. % $Nd_2O_3$)/10A2B | 5.04% |
| Ex. 6 | (5 wt. % $La_2O_3$ + 5 wt. % $CeO_2$)/10A2B | 5.11% |

Table 3 shows electronegativity values of the carriers. The electronegativity was a weighted average of the electronegativity (Pauling's electronegativity) of a metal or metals forming the corresponding metal oxide and that of oxygen, based on the compositional proportions of the elements contained in the metal oxide. As shown in Table 3, aluminum borate serves as an acidic carrier having an electronegativity higher than that of $Al_2O_3$. In the case where aluminum borate is modified with an electron-accepting element such as an alkaline earth metal element or a rare earth metal element, conceivably, electrons are supplied from noble metal elements to the carrier, whereby the noble metal elements are immobilized on the carrier even in a rich region. Also, presumably, the electronegativity of the carrier decreases to be almost a neutral electronegativity, which is equivalent to that of $Al_2O_3$, to thereby attain excellent reactivity (e.g., inhibition of adsorption of exhaust gas components). Thus, as is clear from Tables 1 and 2, Pd dispersion degree and component (in particular, CO) removal reactivity at low temperature are conceivably enhanced, by virtue of the above effects. The electronegativity of the carrier was found to be preferably 2.732 or lower. Also, when the amount of an oxide modifying aluminum borate is adjusted to 7 mass % or more, purification performance and Pd dispersibility can be enhanced. In comparison of Comparative Example 2 with Example 6, even though the electronegativity values of two carriers are almost the same, catalytic activity is remarkably higher in Example 6. Thus, aluminum borate is preferably modified with two or more elements.

Notably, electronegativity can be derived through the following calculation.

In the case of Comparative Example 2, the ratio by mass of $La_2O_3$:$10Al_2O_3 \cdot 2B_2O_3$ in $10Al_2O_3 \cdot 2B_2O_3$ modified with 5 mass % $La_2O_3$ is 5:95. When 5 mass % $La_2O_3$ is reduced to the corresponding mol % value, the value is 18.72 mol % with respect to that of $10Al_2O_3 \cdot 2B_2O_3$ taken as 100 mol %. Pauling's electronegativity values of the elements forming the oxide are as follows: La=1.1, O=3.44, B=2.04, and Al=1.61. Thus, the weighted average is as follows: $\{18.72\% \times (2 \times 1.1 + 3 \times 3.44) + (20 \times 1.61 + 4 \times 2.04 + 36 \times 3.44)\}/(18.72\% \times 5 + 60) = 2.733$.

TABLE 3

| | Material | Electronegativity of carrier |
|---|---|---|
| Comp. Ex. 1 | $Al_2O_3$ | 2.708 |
| — | 10A2B | 2.737 |
| Comp. Ex. 2 | 5 wt. % $La_2O_3$/10A2B | 2.733 |
| Comp. Ex. 3 | (1 wt. % $La_2O_3$ + 2 wt. % BaO)/10A2B | 2.733 |
| Ex. 1 | (5 wt. % $La_2O_3$ + 5 wt. % SrO)/10A2B | 2.722 |
| Ex. 2 | (5 wt. % $La_2O_3$ + 5 wt. % $Pr_6O_{11}$)/10A2B | 2.731 |
| Ex. 3 | (5 wt. % $La_2O_3$ + 5 wt. % CaO)/10A2B | 2.714 |
| Ex. 4 | (5 wt. % $La_2O_3$ + 5 wt. % BaO)/10A2B | 2.725 |
| Ex. 5 | (5 wt. % $La_2O_3$ + 5 wt. % $Nd_2O_3$)/10A2B | 2.730 |
| Ex. 6 | (5 wt. % $La_2O_3$ + 5 wt. % $CeO_2$)/10A2B | 2.732 |

The invention claimed is:

1. An exhaust gas purification catalyst carrier, comprising a modified aluminum borate which contains aluminum borate represented by formula $10Al_2O_3 \cdot 2B_2O_3$ or formula $9Al_2O_3 \cdot 2B_2O_3$, and as addition elements, a combination of La with Pr, said combination being in an amount of 6 mass % to 13 mass % as oxides thereof.

* * * * *